March 17, 1970 H. Y. DE LAVENNE 3,501,093
AIR HEATING CONTROL SYSTEM
Filed March 22, 1968 2 Sheets-Sheet 2
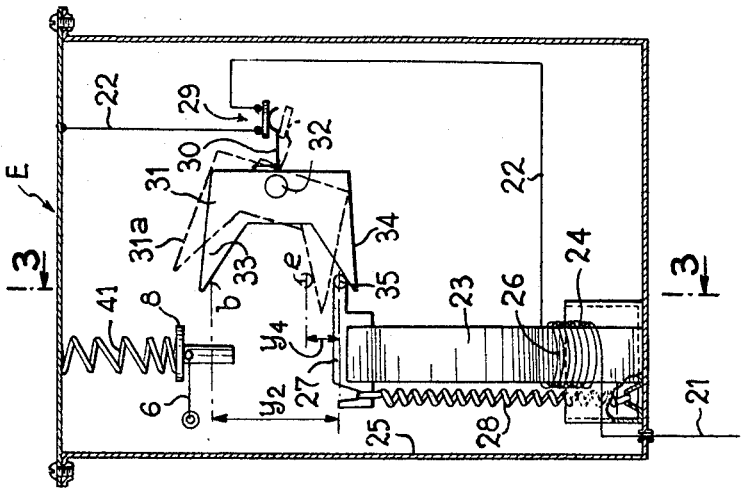
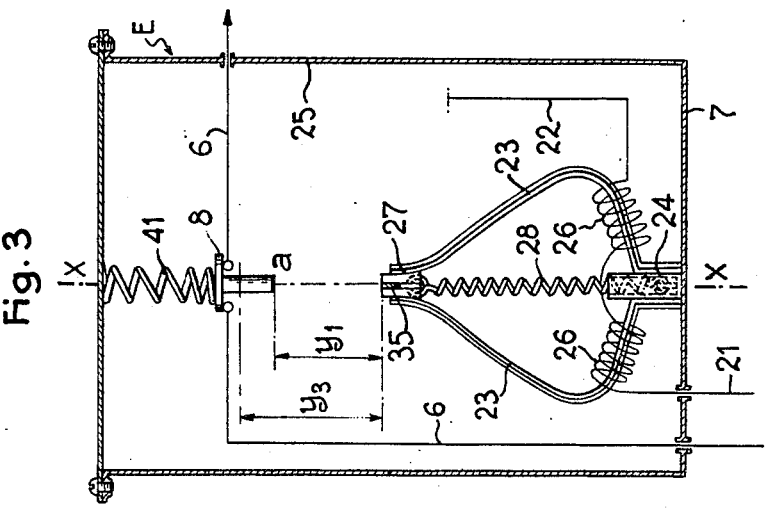
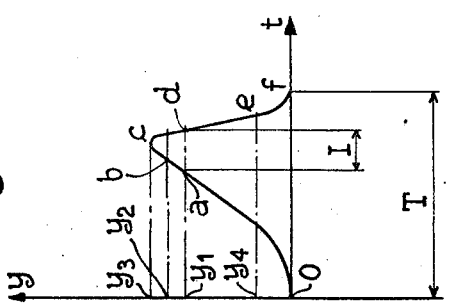

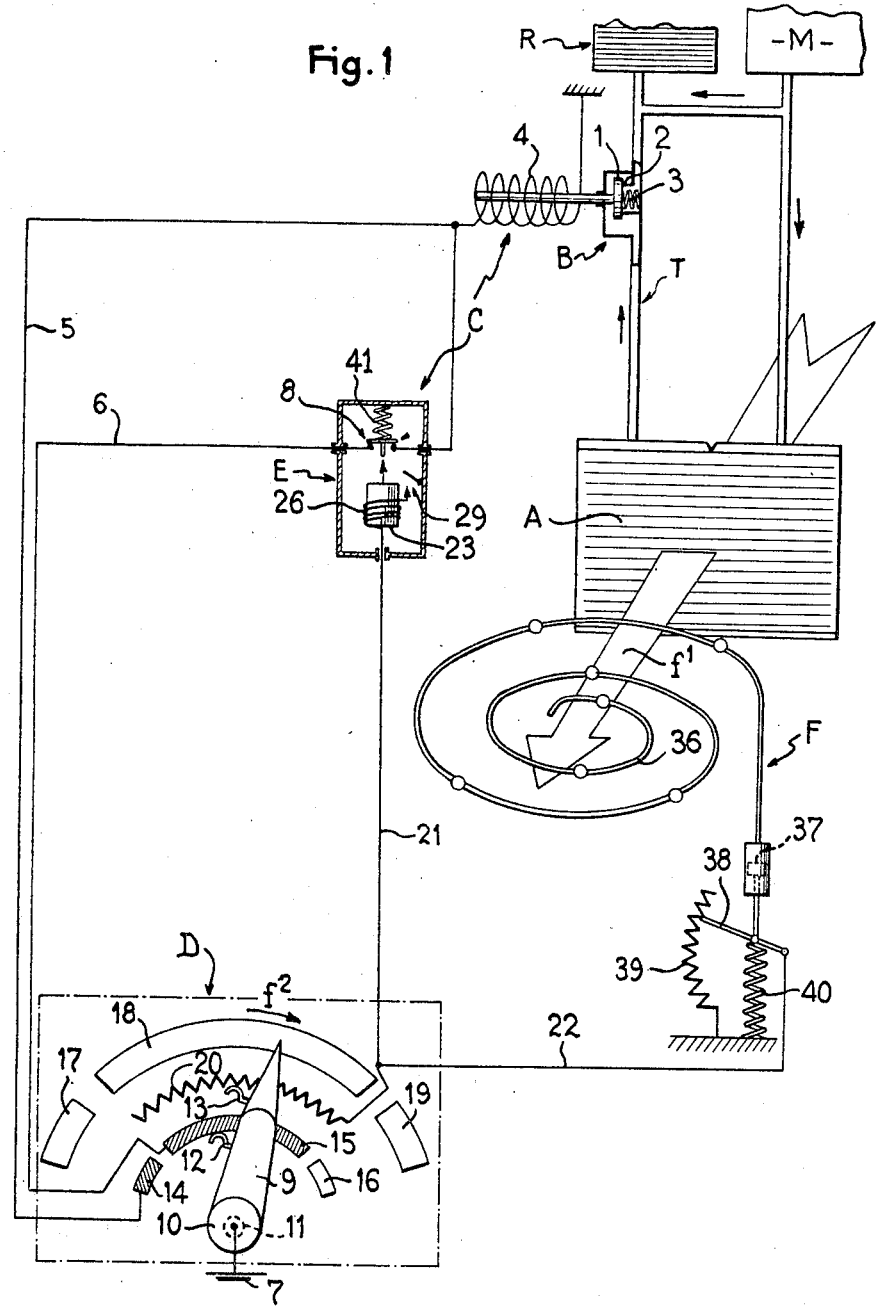

United States Patent Office 3,501,093
Patented Mar. 17, 1970

3,501,093
AIR HEATING CONTROL SYSTEM
Hubert Yves de Lavenne, Meudon-Bellevue, France, assignor to Automobiles Peugeot, Paris, France, a French body corporate, and Regie Nationale des Usines Renault, Billancourt, France, a French body corporate
Filed Mar. 22, 1968, Ser. No. 715,440
Claims priority, application France, May 10, 1967, 105,852
Int. Cl. G05d 23/00
U.S. Cl. 236—68                         6 Claims

ABSTRACT OF THE DISCLOSURE

A method and device for setting an air conditioning installation in particular for an automobile vehicle, said method comprising admitting, by an all-or-nothing system, the fluid supplying the air conditioning power, that is, by alternately allowing and stopping in a complete manner, the circulation of said fluid so that the flow is alternately maximum or zero, and setting the air conditioning power furnished by manually setting the duration and frequency of the interruptions of the circulation of said fluid.

---

The present invention relates to an air conditioning of automobile vehicle and premises and more particularly to the heating thereof by mean of a liquid or gaseous hot fluid supplying the air conditioning power.

It is conventional practice to set or regulate the power supplied for the air conditioning by means of a cock or other device which throttles to a greater or lesser extent and in a permanent manner, the flow of the hot fluid, for example in the case of an automobile vehicle the flow of water which passes through an air heater and comes from the radiator placed in the cooling water circuit of the engine, this air heater heating air passing therethrough as it is admitted into the passenger or driver compartment.

Such a greater or lesser throttling has drawbacks when, in mild weather, only a slight heating is desired. Indeed, even a very small opening of the device regulating the flow of the fluid can still result in an excessive heating. If this fluid is water, for example coming from the radiator, the throttling created in the piping circulating this water encourages the deposit of foreign matter and contributes to a rapid clogging of the circuit.

The object of the invention is to remedy these drawbacks. The invention provides a method for setting an air conditioning installation for a vehicle or other means, comprising admitting by an all-or-nothing system, the fluid supplying the air conditioning power that is by alternately allowing and stopping in a complete manner, the circulation of said fluid so that the flow is alternately maximum or zero, and setting the air conditioning power furnished by manually setting the duration and frequency of the interruptions of the circulation of said fluid.

The frequency of the interruptions and their duration determine a mean or effective flow of water or other fluid, to which the air conditioning power is directly related. The thermic inertia of the air heater or other heating apparatus renders the effect of the flow impulses unnoticeable on the air conditioning temperature.

If I is the duration of the circulation of the fluid, repeating at each period of time T corresponding to the duration of the cycle, it is possible to define the resultant effective flow of fluid by the ratio $K = I/T$.

If $T=I$, $K=1$, the effective fluid flow (and the heating power furnished) is maximum. This is the case when the circulation of the fluid is established permanently. If $T = \infty$ $K=0$, the flow fluid is nil and the heating stops. This is the case upon permanent stoppage of the circulation.

Experience has shown that for $\frac{1}{20} \leq K \leq \frac{1}{4}$, the heat exchange is such that it creates any air conditioning temperature within the aforementioned limits.

The method of setting is however only acceptable if the thermic inertia of the heating apparatus is such that the amplitude of the variations in the air conditioning temperature is small enough to be unnoticed by the occupants of the vehicle.

Consequently it is of interest, while retaining the coefficient of the effective flow of the fluid inherent in the required setting, not to have a constant duration of circulation of this fluid but to decrease this duration as K becomes smaller, this permitting, while conserving a small effective fluid flow, reducing the period during which the circulation is stopped and facilitating carrying out the method by limiting the range of the different cycle duration values.

According to another feature, there is superimposed on the manual setting of the frequency and duration of the interruptions of the circulation of the fluid furnishing the air conditioning power, an automatic regulation of this frequency and duration as a function of variations in a parameter, such as the final temperature of the desired air conditioning, so as to neutralize any action on the manual setting of variations in other parameters likely to influence it, such as conditions of the surrounding atmosphere and in particular the outside temperature, the speed of the engine (flow of water) and the speed of the vehicle, in the case of a vehicle. In other words, the setting is under the control of a phenomenon which is the consequence of said parameters.

Another object of the invention is to provide a device for setting an air conditioning installation in accordance with the aforementioned method.

Said device comprises, in combination with a conduit for circulating the fluid which furnishes the air conditioning power: a valve in said conduit, actuating means for alternately fully opening and fully closing said valve, a pulse generator adapted to act on said actuating means so as to close said valve with given frequency and duration, and manual setting means for setting said frequency and duration.

According to one embodiment, the valve is electromagnetic, the actuating means being the coil of said valve and an electric circuit provided with a switch and adapted to excite said coil whereas the pulse generator comprises a bimetallic member controlling said switch, an electric resistor for heating said thermocouple, an electric circuit feeding said resistor and a switch in said heating circuit actuated by said bimetallic member so as to open said heating circuit after said bimetallic member has closed said switch, and manual setting means comprising a rheostat in said heating circuit of said resistor.

To achieve a regulation as a function of the temperature of the air conditioning, an element is provided which is responsive to said temperature and actuates a rheostat connected in parallel or in series with the thermocouple heating resistor.

Another object of the invention is to provide an air conditioning installation provided with the aforementioned setting device.

Further features and advantages of the invention will be apparent from the ensuing description with reference to the accompanying drawings.

In said drawings:

FIG. 1 shows diagrammatically the assembly of the setting and regulating device according to the invention;

FIG. 2 is a partial side elevational view of an embodiment of the pulse generator;

FIG. 3 is a sectional view of the generator taken along line 3—3 of FIG. 2, and

FIG. 4 is a diagram translating as a function of time T plotted as abscissae, the linear displacement y, plotted as ordinates, of the active part of the pulse generator shown in FIGS. 2 and 3.

In the illustrated embodiment, the invention is shown to be applied to the manual setting or adjustment of an automobile vehicle air conditioner and to the automatic regulation of this setting, that is, the automatic maintenance of the temperature obtained in the compartment at any given value set by the manual setting.

As concerns the air conditioner, only the air heater A is shown, the air to be heated and introduced into the compartment flowing through this air heater in the direction of arrow $f_1$, the heat required being taken from the engine M of the vehicle owing to the fact that the air heater A is connected in parallel with the circuit which connects the engine M to the conventional cooling radiator R. The direction of flow of the hot water is indicated by the arrows. The air heater A is upstream of the radiator R and directly receives a part of the hot water leaving the engine.

The device according to the invention comprises:

A valve B in the conduit or pipe T which connects the air heater A to the radiator R;

Electromechanical means C for actuating said valve;

A manual control device D for manually selecting or setting the rate of heating and the desired temperature;

A pulse generator E controlling said electromechanical means; and

A regulating device F which automatically ensures that the selected temperature remains constant.

The valve B is an electromechanical valve. Preferably, the arrangement is such that this valve is normally open, its closing element 1 being separated from its seat 2 by a spring 3 whereas the excitation of the coil 4 applies it against the seat so as to permit a possible heating of the compartment of the vehicle in the event of breakdown of the device and to avoid consumption of electricity for starting up the impulse generator E or for the full heating power. It is however obvious that an obsolutely identical result could be obtained in employing an electrovalve which closes upon lack of current, but this solution would not permit heating in the event of breakdown of the device.

The electromechanical means C controlling the valve comprise the coil 4 and two parallel feed conductors 5 and 6 connected to the battery or other power source 7, through the control device D, this being achieved directly in respect of the conductor 5 and through a switch 8 controlled by the pulse generator E in respect of the conductor 6.

The manual control device D, which can be for example located on the dashboard of the vehicle, comprises a handle or lever 9 integral with a knob 10 or other actuating means which drives it in rotation about the spindle 11. This lever carries two slides 12 and 13 connected to the positive pole of the source 7. The slide 12 is capable of coming in contact with any one of three studs in the shape of arcuate sectors 14, 15, 16 in the region of which are marked on curved plates 17, 18 and 19, the respective indications, such as "COLD," "SETTING-REGULATION" and "WARM." The slide 13 is capable of rubbing on a resistor 20 with which it forms a rheostat and which is disposed angularly in line with the stud 15 and the plate 18 (setting). The stud 14 is directly connected to the conductor 5. The stud or sector 15 is connected to the conductor 6 and to the electromagnet 4 of the valve through the switch 8 which is controlled by the pulse generator E.

The resistor 20 is connected in parallel, through the conductor 21, to this generator E and, through the conductor 22, to the regulation device F. The pulse generator E (FIGS. 2 and 3) comprises a bimetallic member having two elements 23 disposed symmetrically relative to an axis X—X (FIG. 3) and fixed at their base on a support 24 which is secured to the bottom of a box 25. The two elements of the bimetallic member are bent and an electric resistor 26, wound round them, straightens them by heating which shifts (as viewed in FIGS. 2 and 3) their upper ends (interconnected by a fitting 27) upwardly in opposition to the action of a return spring 28 located in the plane of symmetry of the thermocouple. The resistor 26 is connected to the power source 7 through the conductor 21 and the rheostat 20, 13 and current is supplied thereto or cut off by connecting to the ground by means of a contactor 29 whose moving element is fixed by a member 30 to a fork 31. The latter is pivotable about a spindle 32 carried by the box 25 and it comprises two arms 33 and 34 capable of being driven by the movement of a finger 35 which is carried by the member 27 and therefore integral with the free end of the thermocouple. Fork 31 is arranged to be maintained stationary in its extreme positions, this being achieved either by friction of the fork on its pivot spindle or by a ball locking device or the like.

The arrangement is such that the contactor 29 is closed when the fork 31 is in the position shown in full line in FIG. 2 and open when this fork is pivoted to the position shown at 31ª in dot-dash line by the finger 35 which bears under the arm 33 at b. There is consequently an intermittent feeding of the resistor 26 of the bimetallic member which extends when the resistor is fed and thereafter returns to its initial position under the action of the return spring 28 when the resistor is not fed.

Located on the axis X—X of the bimetallic elements 23 and above the latter, is a switch 8 of the electrovalve-exciting circuit 6 in such position that the free end of the bimetallic member opens this switch 8 in the course of each of its to-and-fro movements by raising the moving part of the switch. When the bimetallic elements retract, the switch 8 is returned to the closed position by a spring 41.

The regulating or stabilizing device F is placed in the hot air conduit between the air heater A and the inlet of the hot air in the compartment. It comprises a thermostat element 36 whose expansible material acts on a piston 37 which is urged against the slide 38 of a rheostat 39 which is connected in parallel to the pulse generator-exciting circuit through the conductor 22. A return spring 40, whose action is opposite to that of the expansible material of the thermostat element, maintains the slide 38 constantly against the piston 37.

The assembly operates in the following manner:

As already mentioned, the lever 9 of the control device can occupy, as desired by the user, any of the following three positions:

"Warm" position (on the sector 19) in which the slides 12 and 13 have no electric contact. In this position neither the electric pulse generator E nor the electrovalve B is fed so that this valve is then permanently open.

"Cold" position (on the sector 17) in which the impulse generator E is not fed, since the slide 13 has no electric contact whereas the electrovalve B is supplied with current through: lever 9, slide 12 and stud 14, and is permanently fed.

A setting-regulation range of positions (on the sector 18) in which the electrovalve B is fed through the switch 8 which is controlled by the generator E and through the electric connection: lever 9, slide 12, stud 15, whereas the generator E is fed through the electric connection: lever 9, slide 13 and rheostat 20.

As seen in FIG. 1, the more the lever 9 is shifted in the direction of arrow $f^2$ towards the "warm" position, the more the rheostat 20 is put out of the electric circuit and the stronger the excitation current of the pulse generator E and, consequently, the greater the ratio K defined hereinbefore.

When the lever 9 of the control device D is in the setting-regulation position, the excitation current supplied to the pulse generator E passes through the resistor 26 (FIGS. 2 and 3) and this shifts the upper end of the bimetallic member upwardly at more or less high speed, depending on the intensity of the excitation current.

In the course of its movement, the fitting 27 carried by the end of the member 23 acts at $a$ (FIG. 3) on the moving part of the switch 8 which opens and cuts off the current feeding the electrovalve B and thus opens the latter.

As the heating of the bimetallic member continues to produce effect, the finger 35 encounters the upper arm 33 of the fork 31 at $b$ (FIG. 2) and this pivots the fork to the position shown at $31^a$ in dot-dash line and thus opens the contactor 29 and breaks the feed circuit of the resistor 26 of the member 23.

The thermic inertia of the assembly however results in the bimetallic member continuing to deform slightly before returning to its intial position under the effect of the spring 28. In the course of the return movement of the bimetallic member, the following are effected:

The switch 8 is closed under the action of the spring 41 and reconnects the current feeding the electrovalve B and thus closes the latter.

The finger 35 encounters the arm 34 of the fork at $e$ (FIG. 2), this fork being at this moment in position $31^a$, and this pivots the fork downwardly and closes the contactor 29 and thus re-establishes the supply of current to the terminals of the resistor 26.

The cycle just described is reproduced indefinitely so long as the conditions remain unmodified.

In FIG. 4, which shows the linear displacement $y$ of the bimetallic member as a function of time $t$ in the course of a cycle T, the points indicated $a, b, \ldots f$ correspond to the various actions mentioned hereinbefore, the corresponding movements of the bimetallic member also being indicated in FIGS. 2 and 3:

At $a$, after an upward travel $y^1x$ of the bimetallic member, cutting off of the feed current of the electrovalve B;

At $b$, after an upward travel $y^2$, the cutting off of the feed current of the pulse generator E; depending on the thermal inertia of the assembly, the point $b$ could be in front of or behind the point $a$ or even coincide with the latter;

At $c$, the extreme point of movement $y^3$ of the bimetallic member;

At $d$, the re-establishment of the feed current of the electrovalve B;

At $e$, re-establishment of the excitation current of the pulse generator E;

At $f$, end of the cycle T and the start of the following cycle.

The period of opening of the electrovalve B is the time I between the point $a$ and the point $d$.

It is clear from this graph that although the part of the cycle $c-f$ is practically constant in time since it depends only on the action of spring 27, the same is not true of the part $O-c$ in which the time varies with the conditions of heating of the bimetallic member 23, that is, with the intensity of the electric current passing through the resistor 26. The higher the power of heating of this resistor, the steeper the slope of the curve $O-c$ and the shorter the duration of the cycle T.

It has indeed been seen that this power is a function of the position of the lever 9 of the control device D in the "setting-regulation" zone 18. It is also a function of the action of the regulating device F.

Indeed, an increase in the temperature of the hot air corresponds to a displacement of the slide 38 on the rheostat 39 in the direction for decreasing the excitation voltage at the terminals of the pulse generator E which thus decreases the power of heating of the bimetallic member. The procedure is reversed when the temperature of the air issuing from the air heater A decreases, owing to the action of the return spring 40.

Although a specific embodiment of the invention has been described, many modifications and changes may be made therein without departing from the scope of the invention as defined in the appended claims.

A modification of the invention consists in placing the regulating or stabilizing device F electrically in series with the pulse generator E. In this case, a rise in the temperature of the air must bring the slide 38 in the direction for increasing the value of the resistance 39 for decreasing the excitation current of the pulse generator E.

There are other possibilities. They consist in the replacement of the pulse generator E previously described by a timing device or by a purely electronic device producing the same result.

If a thermostatic regulation is not desired but only the manual setting, it is possible to purely and simply eliminate the stabilizing device F.

Having now described my invention what I claim as new and desire to secure by Letters Patent is:

1. A device for setting an air conditioning installation, in particular for an automobile vehicle, said installation comprising a heat exchanger and a fluid flow conduit which furnishes the air conditioning power to said heat exchanger, said device comprising, in combination, an all-or-nothing solenoid valve in said conduit, a first feed circuit for continuously energizing the solenoid of said solenoid valve, a second feed circuit for periodically energizing said solenoid, which comprises a switch, pulse generator means including a bimetallic member adapted to act on said switch so as to close the valve with a given frequency and duration, means for selecting one of said feed circuits, manual setting means for setting said frequency and said duration, and further automatic setting means responsive to the air temperature at the outlet of the heat exchanger for varying said frequency and said duration.

2. A device as claimed in claim 1, wherein said pulse generator means comprise a bimetallic member controlling said switch, a resistor for heating said bimetallic member, an electric feed circuit for said resistor and a contactor inserted in said feed circuit and actuated by said bimetallic member so as to open said feed circuit after said bimetallic member has closed said switch, said manual setting means comprising a first rheostat in said feed circuit.

3. A device as claimed in claim 2, wherein the bimetallic member comprises two arcuate strips arranged symmetrically and fixed in position at two facing ends, the other two ends of the strips being interconnected and movable and the switch being located in their path of movement, said other two ends carrying a finger which cooperates with a pivotable fork controlling the contactor in said feed circuit.

4. A device as claimed in claim 1, wherein said further automatic setting means responsive to the air temperature at the outlet of the heat exchanger comprises an element responsive to said temperature and a second rheostat which is connected in parallel with said first rheostat in said feed circuit of the resistor, the element being combined with said second rheostat to actuate said second rheostat.

5. An air conditioning installation, in particular for an automobile vehicle, comprising a heat exchanger and a fluid flow conduit which furnishes the air conditioning power to said heat exchanger, and a device for setting the installation, said device comprising in combination: an all-or-nothing solenoid valve in said conduit, a first feed circuit for continuously energizing the solenoid of said solenoid valve, a second feed circuit for periodically energizing said solenoid, which comprises a switch, pulse generator means including a bimetallic member adapted to act on said switch so as to close the valve with a given frequency and duration, means for selecting one of said feed circuits, manual setting means for setting said frequency and said duration, and further automatic setting means responsive to the air temperature at the outlet of the heat exchanger for varying said frequency and said duration.

6. A device as claimed in claim 2, wherein said means for selecting one of said feed circuits and said rheostat are controlled by the same actuating member.

References Cited

UNITED STATES PATENTS

| | | |
|---|---|---|
| 1,881,884 | 10/1932 | Noble. |
| 2,301,708 | 11/1942 | Roessler _____ 236—68 |
| 2,407,089 | 9/1946 | McFall. |
| 3,005,896 | 10/1961 | Whinery. |
| 3,401,880 | 9/1968 | Verden. |

EDWARD J. MICHAEL, Primary Examiner